Figure 1:
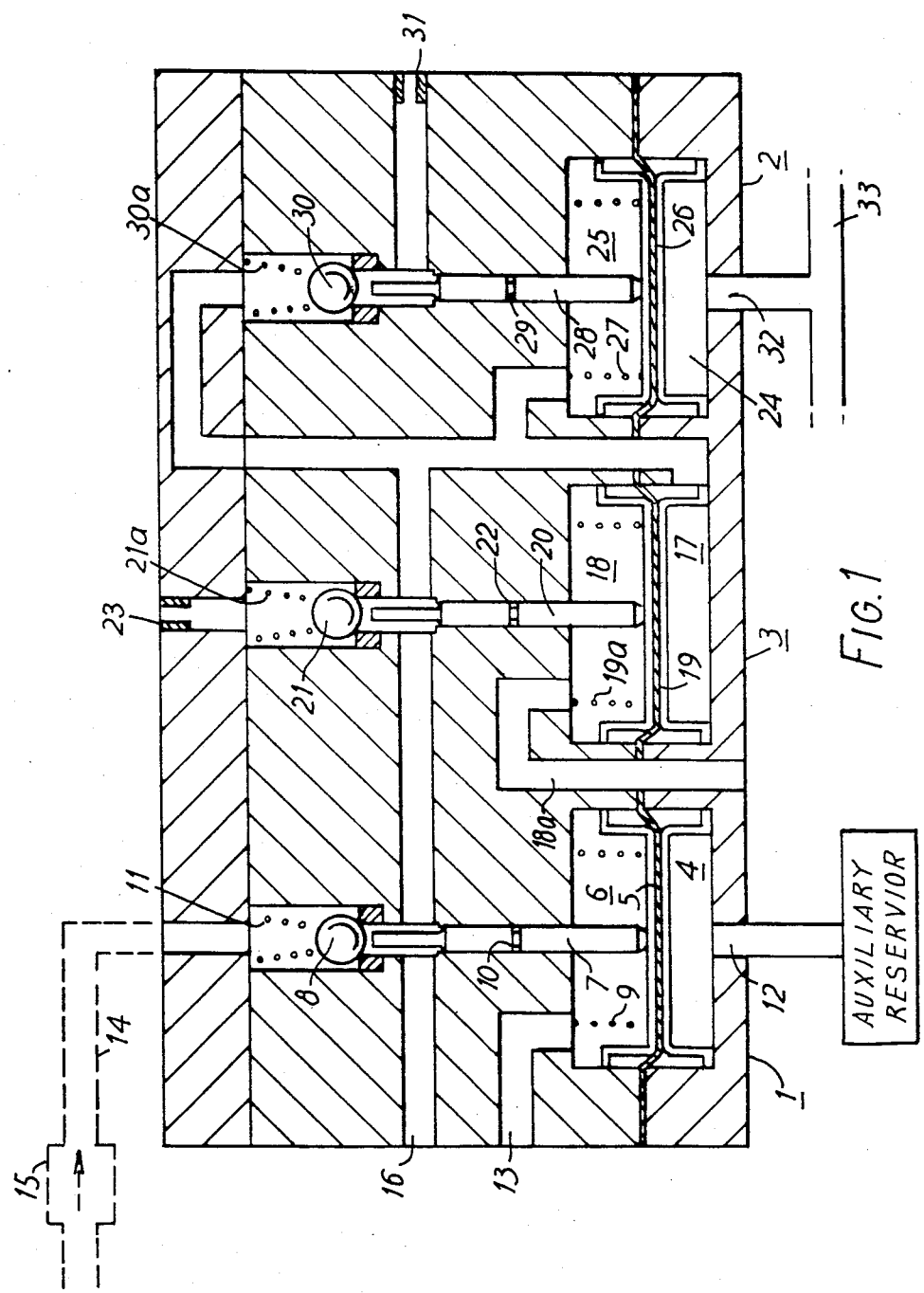

United States Patent [19]

Wickham

[11] Patent Number: 4,571,008
[45] Date of Patent: Feb. 18, 1986

[54] CONTROL VALVE ARRANGEMENT

[75] Inventor: David J. Wickham, Chippenham, England

[73] Assignee: Westinghouse Brake & Signal Company, Chippenham, England

[21] Appl. No.: 416,079

[22] Filed: Sep. 8, 1982

[30] Foreign Application Priority Data

Sep. 11, 1981 [GB] United Kingdom ............... 8127541

[51] Int. Cl.⁴ ............................................. B60T 15/22
[52] U.S. Cl. ......................................... 303/33; 303/37
[58] Field of Search ............................. 303/33, 36–39, 303/63, 40, 69, 75; 137/596.15

[56] References Cited

U.S. PATENT DOCUMENTS 4,161,340  7/1979  Hart ..................................... 303/33
4,169,490  10/1979  Taplin ........................... 137/596.15
4,339,155  7/1982  Hart ..................................... 303/38

Primary Examiner—Duane A. Reger
Assistant Examiner—Alvin Oberley
Attorney, Agent, or Firm—Larson and Taylor

[57] ABSTRACT

A control valve arrangement adapted to produce and maintain a pilot signal comprises a number of standard modules. The basic element has two standard modules, each of which includes a diaphragm-controlled on-off valve. An input signal is applied to a first valve against a reference pressure such that when the valve is on, a signal is generated and held as a pilot pressure. A second valve responds to a fall in input signal pressure to cancel out pilot pressure. The two valves together constitute a bistable operator. A particular use of this operator is in a railway braking system in which the first valve is used as an application valve and the second valve is used as a release valve. A third module may be used as a pilot pressure-maintaining valve. The pneumatically-operated diaphragm assembly shown in FIG. 1, comprises three modules, 1, 2 and 3. Module 1 is the brake application module, module 2 is the release module and module 3 is an optional pilot pressure-maintaining module. Each module includes a ball valve 8, 21, 30, operated by respective diaphragms 5, 19, 26. Modules 1 and 2 act as a bistable operator producing the pilot pressure and module 3 acts to maintain the pilot pressure.

10 Claims, 2 Drawing Figures

CONTROL VALVE ARRANGEMENT

This invention relates to a control valve arrangement adapted to produce and maintain a pilot signal.

According to the invention there is provided a control valve arrangement in which an input signal is applied to a first diaphragm-controlled on-off valve against a standard reference pressure such that when the valve is 'on' a signal is generated and held as a pilot pressure, the arrangement comprising a second diaphragm-controlled on-off valve which responds to a fall in input signal pressure to cancel out the pilot pressure.

The valve arrangement may be used as a control valve in a railway braking system, the first diaphragm-controlled valve being used as an application valve and the second diaphragm valve is a release valve.

The two valves together constitute a bistable operator. In one state of the operator, the pilot signal is generated and held constant. In the other state, the pilot signal is cancelled out.

A third diaphragm-controlled on-off valve may be included in the valve arrangement adapted to supply air to a pilot pressure supply chamber so as to maintain the pressure in that chamber against any leakage.

The pilot pressure produced by the valve may, in a direct release railway braking system, be employed to pilot the switching of other functions pneumatically.

To put this particular use of the valve arrangement into perspective, it should be explained that where very long trains of vehicles are employed using pneumatic braking systems in order to provide rapid release operation of the braking system over long distances (some trains are over one mile in length), it is necessary to have a direct release braking system rather than a graduated release system.

In most systems a so-called brake pipe runs the length of the train and is charged to a high pressure (say 70 to 110 p.s.i.) and from this pipe reservoirs on each wagon are charged.

The brakes are normally held-off in their release position and, to apply the brakes, a piston is used actuated by air pressure.

A control valve senses the pressure situation and ensures that the brake cylinder has no pressure in it so that the brakes are held-off.

To apply the brakes, the pressure in the brake pipe is reduced, the control valve (which may be, or include, a triple valve) senses the reduction in pressure in the brake pipe and applies brake pressure in proportion to the reduction in brake pipe pressure.

The control valve applies the pressure to apply the brake by employing the air from the reservoir which has already been supplied through the brake pipe.

Reduction in brake pipe pressure from, say, 70 to 50 p.s.i., applies full brakes. To take the brakes off would take a long time if the brakes were operated on a graduated principle.

To overcome this time lag, the control valve, usually a triple valve, is in the form of a bistable valve which responds to pressure differences as little as one to two pounds per square inch.

While application of the brakes can be done in steps, release of the brakes results from a very small rise in pressure in the brake pipe which operates the bistable control valve which, in turn, operates a series of other valves to release the brakes and carry out other operations.

Many control valves or triple valves are known, one example being the Westinghouse 21A valve described, for instance, in Patent Specification No. 1 280 263.

This control valve operates pneumatically and, in turn, operates a series of other valves mechanically. The other valves may, for instance, include a valve for switching auxiliary pressure, a valve for switching brake pipe pressure, brake cylinder exhaust and inlet valves etc.

Each of these auxiliary devices is intended to act at a slightly different time and this means that, in practice, the auxiliary devices have to be critically machined to high tolerances to deal with a sequence of functions which must happen exactly in the right order.

An objective of this invention is to separate the functions of the control valve from the subsequent operation of the auxiliary devices so that the auxiliary devices are operated pneumatically.

A further objective is to provide a series of standard module switches which can be used to operate the auxiliary functions, all of these switches being pneumatically operated by a bistable operator.

In a specific valve arrangement incorporating this invention, the valve assembly comprises at least two modules, the first module being an application module and the second module being a release module, the application module operating an on-off valve, which may be a ball valve, to apply said pilot pressure so as to pneumatically operate other functional valves in the system, the release module operating on increase of brake pipe pressure so as to exhaust pilot pressure thus causing a drop in pressure which, in turn, is used to operate the functional valves. A third module may provide the pilot pressure-maintaining pressure which is brought into operation when the application valve is operated.

The application module preferably comprises a diaphragm valve supplied on one side with auxiliary reservoir pressure and, on the other side, with brake pipe pressure and adapted to operate an on-off valve which supplies pilot pressure from a suitable source to pneumatically operate all the other functions including application of the brakes.

The pilot pressure may be derived from auxiliary reservoir pressure or from brake pipe pressure. If brake pipe pressure is employed, a check valve or poppet valve must be included in the line to the on-off valve.

The second or release module may comprise a constructionally similar diaphragm valve, brake pipe pressure being applied to one side of the diaphragm and the pilot pressure to the other side of the diaphragm so that the release valve responds to a very small rise (say 1½ p.s.i. in brake pipe pressure) to operate the diaphragm valve so as to open the on-off valve which allows pilot pressure to exhaust. As soon as this happens, the on-off valve on the application valve, closes again. Thus, there is an immediate fall in pilot pressure in the brake-applying cylinder which initiates brake release.

The third module may be similar in construction to the other two and has pilot pressure applied to one side of its diaphragm and atmospheric pressure or other pressure applied to the other side. When pilot pressure is available, as a result of the application diaphragm valve operating the on-off valve, incorporated into this third module, opens to supply auxiliary reservoir pressure to the pilot pressure circuit so as to maintain pilot pressure against any leakage.

IN THE ACCOMPANYING DRAWINGS

Figure 2:
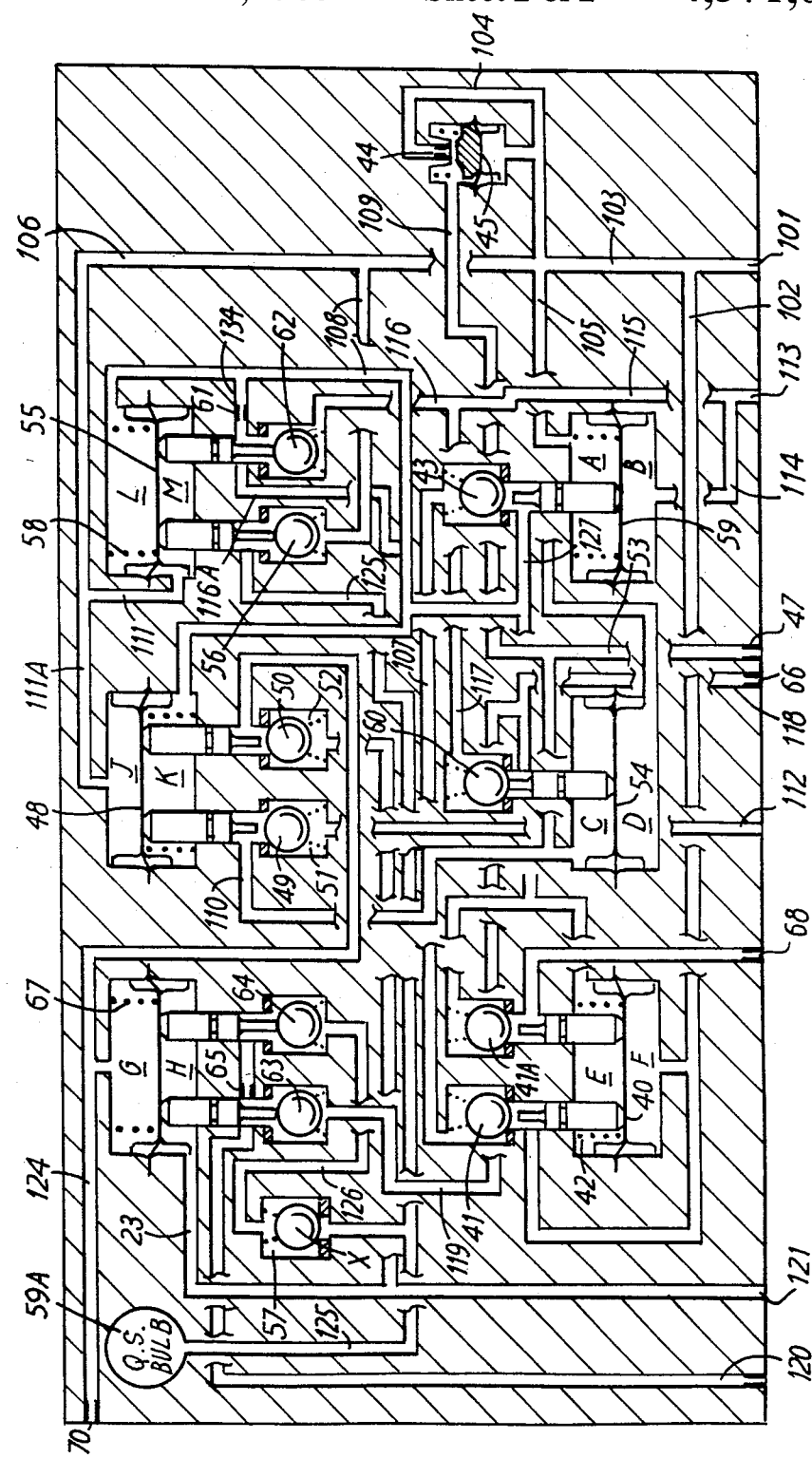

FIG. 1 illustrates a brake control device comprising a pneumatically-operated diaphragm assembly in accordance with the present invention; and FIG. 2 shows the brake-controlling valve device of FIG. 1 incorporated into a triple service valve and illustrates the way in which the pilot pressure derived from the brake-controlling valve device is employed to operate pneumatically other functions normally included in a control valve service valve.

The pneumatically-operated diaphragm assembly shown in FIG. 1 comprises three modules, 1, 2 and 3. Module 1 is the brake application module, module 2 is the release module and module 3 is an optional pilot pressure-maintaining module.

The application module 1 includes a resilient diaphragm 5 which acts as a dividing wall between two chambers 4 and 6. Abutting, but not connected to diaphragm 5, is a valve stem 7 which operates an on-off or ball valve 8. The stem 7 passes through a seal 10.

The diaphragm 5 is biassed by a spring 9 to the position shown in FIG. 1. The ball valve 8 is biassed by a spring 11 to its closed position.

Auxiliary reservoir (AR) pressure is applied to the chamber 4 via port 12, and brake pipe pressure (BP) via port 13 to the chamber 6. Either AR pressure or BP pressure is applied via pipe 14 to the ball valve 8. If BP is used, it is applied through a non-return valve 15.

A fall in BP will cause diaphragm 5 to flip-over which, in turn, will open the ball valve 8 to allow either AR or BP (whichever is employed) to be applied via passage 16 which acts as the pilot pressure to initiate application of the brakes and to operate other functions pneumatically.

Module 2 is the release module and has similar chambers 24 and 25 and diaphragm 26, abutting a piston stem 28, which extends through a seal 29 to operate a ball valve 30, held on its seat by a spring 30A. One side of ball valve 30 is connected to atmosphere through pilot exhaust choke 31 and the other side of ball valve 30 is connected to pilot pressure line 16 and to chamber 27 and to chamber 17 of the third or pilot-maintaining module 3.

The chamber 24 of module 2 is connected to BP via port 32, the brake pipe being shown at 33. Diaphragm 26 is biassed to the position shown by a spring 27.

Module 3, the pilot pressure-maintaining module, is mechanically similar to the other two modules, comprising chambers 17, 18, separated by diaphragm 19 biassed by spring 19a. The lower chamber 17 is connected to the pilot pressure line 16 and to the release module as described above. Upper chamber 18 is connected via passage 18a to atmosphere. Diaphragm 19 abuts a piston stem 20 which extends through a seal 22 and operates a ball valve 21, biassed to its closed position by a spring 21a. The lower side of ball valve 21 is connected to the pilot pressure line 16 and the upper side is connected to AR via a pilot pressure-maintaing choke 23.

The three diaphragms 5, 19 and 26, may form portions of a single sheet of plastic sandwich material.

The central concept of the invention lies in the replacement of the conventional sequenced main pile functions with a simple bistable operator assembly which pilots the switching of the other functions. The reasons why this simplifies things so much lies in the elimination of the complicated valve-balancing arrangement currently used and which is no longer necessary with valves designed purely for the piloting function.

The elimination of valve sequences from the main pile:
(a) Reduces the need for tight tolerances and the generally critical nature of the whole assembly.
(b) Means that only a short operating stroke is necessary, thereby avoiding the need for built-in slack and a degree of complication on assembly. The short stroke further means that the diaphragm-clamping face radii are no longer critical and also that a longer life of the components can be guaranteed.
(c) Avoidance of offset loads reduces or eliminates the need for accurate guides.

Provision of piloted functions means that each function can be:
(a) Less critical and less sensitive to manufacturing variations.
(b) Made-up of simpler and more standardised parts.

Many bistable pilot valve arrangements are possible. The one described above uses auxiliary reservoir pressures as the pilot and introduces a spring after application. A reversed arrangement in which pressure is dumped to pilot the functions and a spring is eliminated may also be used.

The objectives achieved by the bistable operator are basically as follows:
1. It is small, simple and reliable.
2. Friction effects are minimised.
3. It is positively bistable.
4. Movement to initiate application and release actions is kept to an absolute minimum.

The operation of the system is as follows. The ball valves 8 and 21 and corresponding diaphragms 5 and 19 are in the positions shown in FIG. 1, but the release valve is normally open—i.e. ball valve 30 is off its seat and diaphragm 26 is in the opposite position to that shown in FIG. 1. To make a brake application, the operator reduces brake pressure relative to auxiliary reservoir pressure by as little as 1 p.s.i. This causes the diaphragm 5 in application module 1 to flip-over rapidly so as to open the on-off or ball valve 8, which is supplied with either AR or BP pressure. This auxiliary reservoir pressure, or brake pipe pressure, is then supplied as pilot pressure to initiate all the necessary functions, as described above.

This pilot pressure would go directly to exhaust via open ball valve 30, until the release module 2 operates to close ball valve 30, and this would cause a loss of pressure. To limit this loss, a small pilot exhaust choke 31 is employed adjacent the ball valve 30 of the release module 2.

As soon as this pilot pressure approaches BP in the chamber 25, ball valve 30 closes to prevent further pressure loss under action of spring 30a—i.e. the diaphragm 26 and ball valve 30 assume the positions actually shown in FIG. 1.

Other parts of the valve system, when they operate, cause AR pressure to fall until it equalises BP. Air is then trapped in the pilot pressure line 16 and, if there were the slightest leak, this pressure would be lost. This pressure in the pilot line 16 holds all the other valves and modules in their correct positions so loss must be avoided.

It might be necessary to hold this position for an hour or more. To avoid this problem, the third module is introduced—i.e. the pilot pressure-maintaining module 3. This module 3 responds to pilot pressure which enters chamber 17 to cause diaphragm 19 to flip-over and open its ball valve 21 against pressure of spring 21a. This action feeds pressure from the auxiliary reservoir through a small choke 23 past the ball 21 into the chamber 17 and the pilot pressure circuit including line 16. This maintains any minor leakage.

As long as AR pressure does not drop below BP pressure, the brake will not be released. When brake pipe pressure is increased to more than 1½ p.s.i. above auxiliary reservoir pressure, module 2—i.e. the release module—will operate. Pilot pressure is equivalent in these conditions to auxiliary reservoir pressure, since it is maintained by auxiliary reservoir pressure derived from module 3.

Once the brake pipe pressure increases by 1½ p.s.i. above auxiliary reservoir pressure module 2, diaphragm 26 flips-over to open ball valve 30 so as to exhaust pilot pressure via the pilot exhaust choke 31. The choke 31 is 0.8 mm. diameter, choke 23 is 0.3 mm. diameter. The slightest opening of the release ball valve 30 causes pilot pressure to drop very rapidly. When it drops to the operating pressure of module 3 diaphragm 19, the diaphragm will flip-over to close its ball valve 21 to cut-off the pilot-maintaining pressure supply.

As mentioned above, either auxiliary reservoir pressure or brake pipe pressure could be used as the pilot pressure. If auxiliary reservoir pressure is used, a check valve is not needed. If brake pipe pressure is used, the check valve 15 is necessary to prevent back flow of auxiliary pressure from the pilot-maintaining module into brake pipe when BP is lower than AR,—e.g. in emergency application. The advantage of using brake pipe pressure is that it gives a quick service action because of the small pressure reduction caused as brake pipe pressure fills the pilot circuit.

The assemblies are balanced as much as is necessary. At all critical operations, air reservoir and brake pipe pressures are adequately balanced, thus reducing the need for a great deal of critical balancing. For example, the ball valve 8, 10, of application module 1 has a valve seat diameter close to the stem diameter so that the forces substantially balance. At any critical situation, this ball valve/stem balance is achieved.

FIG. 2 shows the pneumatically-operated diaphragm assembly of FIG. 1, incorporated into a triple valve service valve which includes the functional valves whose operation is to be initiated by pilot pressure.

Referring now to FIG. 2, it will be appreciated that all functions of the bistable operator valve included in FIG. 1 are also included in FIG. 2. However, some of these diaphragms in FIG. 2 perform a dual role in the complete arrangement shown in FIG. 2.

One essential difference has, however, been included in FIG. 2, which is not in FIG. 1. To obtain similar stability levels in application to the known Westinghouse Z1AW control valve, and the W-triple valve, it is desirable to use a brake pipe supply to the bistable operator application valve rather than auxiliary reservoir supply. This is shown as a dotted alternative 14 on FIG. 1. In order to provide brake pipe supply to the application valve, it is necessary to have some sort of cut-off arrangement and this is shown dotted as a check valve 15 in FIG. 1. Such a check valve 15 is extremely difficult to design because of the very low differential needed and large flow capacity. In FIG. 2, a new approach has been adopted and, instead of the check valve, a pilot supply valve has been added to the release valve. This now forms part of the bistable operator and provides an unrestricted flow of brake pipe air to the application valve initially but subsequent to an application, closes to prevent any back flow of auxiliary reservoir into brake pipe pressure when brake pipe pressure is reduced below equalisation.

Referring now to FIG. 2, and considering the charging situation, this can occur in an infinite number of ways, for instance, on a single car or at the front of a train, brake pipe pressure can rapidly attain full pressure. Conversely, at the rear of a train, brake pipe pressure may be charging very slowly; any other rate of charge intermediate between these two rates, will occur at somepoint in the train. The porting is specially arranged relative to the sensitivity choke to prevent high pressure during a rapid charge of brake pipe from causing stems and ball valves to move-off their seats during the charge-up phase due to high pressure under the stem and low pressure on the ball valve.

CHARGE-UP

As shown in FIG. 2, brake pipe pressure enters the valve at port 101 and flows via port 102 to chamber F under the diaphragm 40 of the pilot supply and release valves 41, 41A. The release valve 41A is one of the bistable operator valves and corresponds to valve 30 in FIG. 1. Port 102 also takes brake pipe pressure to the ball valve 41 of the pilot supply valve which is initially closed. However, on attaining approximately 1½ p.s.i. in brake pipe, the pressure in chamber F overcomes the spring 42 to open the pilot supply ball valve 41 and allow brake pipe pressure to feed via port 107 to the top of the closed application ball valve 43. Brake pipe pressure is also transmitted via port 103 and port 105 to the top of the application valve diaphragm chamber A. It also passes via port 104 and the retarded recharge choke 44 to port 109.

If, however, the brake pipe charge is rapid, as at the front of the train, the pressure difference created across the retarded recharge choke 44 acts on the small diaphragm 45 of the retarded recharge valve to overcome the spring 46 which is equivalent to approximately 3 p.s.i. on the diaphragm area to close the retarded recharge valve and prevent further flow through the retarded recharge choke 44. For a slow charge-up or during the later phase of a rapid charge, equalisation takes place across the retarded recharge valve and choke by virtue of the additional brake pipe feed through the auxiliary reservoir charging choke and sensitivity choke 47 and port 109. When the upstream and downstream pressures of the retarded recharge valve 45 get to within 3 p.s.i. of each other, the valve 45 opens and remains open until a subsequent charge or recharge occurs.

Brake pipe pressure is also fed directly via port 106 and port 111 to chamber M above the QS valve 56 and pilot-maintaining valve 62, diaphragm 55, and via port 111A to chamber J above the AR cut-off valve and BC exhaust valve diaphragm 48. The AR cut-off valve 49 and BC exhaust valve 50 are initially closed due to the action of their respective springs 51, 52, but when the brake pipe pressure reaches approximately 5 p.s.i., these valves open and remain open whilst the triple valve is in the release condition. Brake pipe pressure entering the triple valve at the auxiliary reservoir charging and sensitivity choke 47 passes via port 53 into chamber C above the brake cylinder inlet valve diaphragm 54 and via port 110 to the AR cut-off ball valve 49 which, having opened as previously described, allows air to pass via port 112 directly into the auxiliary reservoir. The pilot-maintaining valve forms part of the bistable operator and corresponds to valve 21 in FIG. 1.

Port 108 carries full brake pipe pressure from port 101 to the quick service valve 56 which is initially open and allows brake pipe pressure to move via port 125 to the underside of check valve X. Because the quick service valve 56 takes its supply directly from an external source (full brake pipe pressure rather than from a pressure-restricted source—via pilot-maintaining choke 61), overshooting of the BC inlet valve, resulting from too slow build-up of pressure is avoided. The spring on check valve X is designed to provide a relatively high differential, say, 15 p.s.i. and this prevents brake pipe pressure passing beyond the check valve at this time. When the pressure in chamber M attains approximately 5 p.s.i., the spring 58 above the diaphragm 55 is overcome and this enables the quick service valve 56 to close, preventing any further supply of air via port 125 to check valve X and the quick service bulb 59A.

Brake pipe air flowing via port 112 into the auxiliary reservoir registers back on the triple valve flange face at the auxiliary reservoir port 113, flowing via port 114 to chamber B below the diaphragm 59 of the application valve and port 115 and 117 to the top of the ball valve 60 of the brake cylinder inlet valve. Note that the application valve 43 is the third valve of the bistable operator and corresponds to valve 8 in FIG. 1. Auxiliary reservoir pressure also flows via port 116 to the ball valve 62 of the pilot-maintaining valve.

When the system is fully charged, the position of the valves is as follows:

1. Application valve 43 is closed.
2. The brake cylinder inlet valve 60 is closed.
3. The pilot supply and release valves, 41, 41A, are open.
4. The inshot valve 63 and BC-maintaining valve 64 are open.
5. The AR cut-off valve 49 and BC exhaust valve 50 are open.
6. The quick service valve 56 and pilot-maintaining valve 62 are closed.
7. The retarded recharge valve 45 is open.

At this point, all the brake pipe ports and auxiliary reservoir ports are charged to the same pressure. Brake cylinder pressure is at atmospheric pressure, as is the pilot pressure.

APPLICATION

When brake pipe pressure is reduced, to create a brake application, auxiliary reservoir pressure first flows back via port 112, the AR cut-off valve 49, which is open, port 110 and back through the auxiliary reservoir charging and sensitivity choke 47 into the reducing brake pipe pressure. Additionally, auxiliary reservoir pressure can feed back via port 109 and the open retarded recharge valve 45 and choke 44 into port 104 and back out of the triple valve via ports 103 and 101. A check valve is required to prevent back flow past the retarded recharge valve for improved sensitivity. For very slow rates of brake pipe drop, no application would result since auxiliary reservoir pressure would merely be depleted without creating an adequate pressure difference across the application valve diaphragm 59.

However, when brake pipe pressure reductions are at a sufficiently rapid rate, a pressure difference of approximately 1 p.s.i. is created across the application valve diaphragm 59 causing it to move-up against the spring load and open the ball valve 43. This allows brake pipe pressure from port 101 to flow via the open pilot supply valve 41 into port 107 past the open application valve 43 into port 127 and thereafter into all the pilot diaphragm chambers, namely, E, K and L. When the pressure in chambers K and L approaches the brake pipe pressure in chambers J and M respectively, to within approximately 5 p.s.i., the AR cut-off valve 49 and BC exhaust valve 50 and quick service valve 56 and pilot-maintaining valves 62 operate under the action of their springs. The AR cut-off valve 49 closes to prevent further back-feed of auxiliary reservoir pressure into brake pipe and the BC exhaust valve 50 also closes simultaneously. The quick service valve 56 opens to connect brake pipe pressure from port 108 to the quick service bulb via port 125, the air then passing through check valve X before proceeding through port 126 to the open BC maintaining valve 64, the BC maintaining choke 65, and on into brake cylinder via port 120.

The pilot-maintaining valve 62 opens to connect auxiliary reservoir pressure via the pilot-maintaining choke and port 134 to the pilot chambers E, K and L. When the pressure in the pilot chambers attains approximately 1½ p.s.i. less than the brake pipe pressure, the pilot supply and release valves 41, 41A, close under the action of the spring 42 in chamber E. At this time, the bistable operator is in the applied position and the pilot chambers are being supplied via the pilot-maintaining choke 61 and pilot-maintaining valve 62 from auxiliary reservoir pressure. The brake cylinder inlet valve 60 is now subject to brake pipe pressure in chamber C and auxiliary reservoir pressure, supplied via port 115, pilot-maintaining valve 62 and port 116A, in chamber D. The reduction in brake pipe pressure below auxiliary reservoir pressure which initiated the application, and any subsequent further reductions in brake pipe pressure then cause the BC inlet valve 60 to open and feed auxiliary reservoir pressure from ports 113 and 117 into brake cylinder via port 118 and the brake cylinder application choke 66. Until the closure of the inshot valve 63, at approximately 10 p.s.i. in the brake cylinder, air also feeds via port 119, the open inshot valve 63 and port 120 into the brake cylinder. The BC inlet valve 60 is a self-lapping valve since reductions in brake pipe pressure below auxiliary reservoir pressure which cause the ball valve to open, also results in the auxiliary reservoir pressure being depleted. Hence the pressure in chamber D is depleted until such time as the pressures in chambers C and D are almost equalised and the ball valve 60 recloses.

LAP

In the lap condition, all valves are closed with the exception of the quick service and pilot-maintaining valves 56 and 62 and the retarded recharge valve 45.

Should the brake cylinder pressure subsequently leak down below 10 p.s.i., the BC maintaining valve 64, under the action of the spring 67 in chamber G, will reopen to supply air from the brake pipe via the BC maintaining choke 65 into the brake cylinder at port 120 to maintain it at not less than nominally 10 p.s.i.

RELEASE

In order to bring about a release brake pipe pressure is increased. When the brake pipe pressure in chamber F of the pilot supply 41 and release valve 41A exceeds the pressure in chamber E by approximately 1½ p.s.i., the diaphragm 40 moves-up to open the two ball valves 41, 41A. The opening of the pilot supply valve 41 merely feeds brake pipe pressure via port 107 to the closed application valve 43 and contributes nothing to the release of the bistable operator. The opening of the release valve 41A, or pilot exhaust valve, causes the pilot pressure from the various diaphragm chambers to flow to atmosphere at the pilot exhaust choke 68. This choke is sized so that it is able to reduce the pilot pressure even though it is being fed via the pilot-maintaining choke 65 from auxiliary reservoir pressure. A reduction of pressure in chamber K of approximately 5 p.s.i. results in the opening of the brake cylinder exhaust valve 50, allowing brake cylinder pressure to flow via ports 121 to exhaust via port 124 and the BC exhaust choke 70. At the same time, the AR cut-off valve 49 is opened to provide for the subsequent recharge of auxiliary reservoir pressure from brake pipe pressure. A similar reduction in chamber L causes the quick service valve 56 to close, preventing further supply of air to the quick service bulb 59A and brake cylinder. At the same time, the closure of the pilot-maintaining valve 62 prevents any further feed of air through the pilot-maintaining choke 61 from auxiliary reservoir into the pilot chambers. Pilot pressure continues to fall to atmospheric pressure, as does the brake cylinder pressure at a controlled rate regulated by the BC exhaust choke 70. At this point the complete valve assembly has assumed a similar position to the charge-up situation previously described.

Having thus described our invention what we claim is:

1. A control valve arrangement for controlling a pilot pressure in a pilot pressure output passage in response to a change of a control pressure in a control pressure passage, comprising:

a plurality of independent valve means each arranged to be operated to an open positon by a respective pressure differential responsive operating means, (a) a first of the operating means being responsive to a pressure difference between the control pressure and a first reference pressure in excess of a first predetermined level to open a first of the valve means to provide a communication between a first source of pressure and the output passage to provide said pilot pressure, (b) a second of the operating means being responsive to a pressure difference between the control pressure and a second reference pressure in excess of a second predetermined level to open a second valve means to provide a communication between the output passage and an exhaust port to exhaust said pilot pressure, and (c) a third of the operating means being responsive to a pressure difference between the pilot pressure and a third reference pressure in excess of a third predetermined level to open a third of the valve means to provide a communication between the output passage and a second source of pressure to maintain said pilot pressure.

2. A control valve arrangement as claimed in claim 1 wherein the first source of pressure connected to the first valve means so as to provide the pilot pressure is also connected to the first operating means to provide the first reference pressure.

3. A control valve arrangement as claimed in claim 2 wherein the second source of pressure receives fluid from the first source of pressure connected to the first valve means.

4. A control valve arrangement as claimed in claim 3 wherein the third valve means communicates with the second source of pressure by an aperture relatively more restricted than the first valve means.

5. A control valve arrangement as claimed in claim 1 or 4 which is used in a railway braking system whrein the first valve means is connected to act as a brake application valve and the second valve means is connected to act as a brake release valve.

6. A control valve arrangement as claimed in claim 5 wherein the railway braking system is of the direct release kind in which a brake pipe containing a brake pipe pressure is connected to provide the control pressure, an auxiliary reservoir containing an auxiliary reservoir pressure is connected to provide the first reference pressure, the auxiliary reservoir is also connected so as to comprise the first source of pressure, an in which the pilot pressure produced by the valve is connected to pneumatically pilot the switching of other functional valves in the railway system.

7. A control valve arrangement as claimed in claim 6 wherein the first operating means includes a diaphragm which is subject to auxiliary reservoir pressure on one side and to brake pipe pressure on the other side, the arrangement being such that when brake pipe pressure falls to a predetermined level below auxiliary reservoir pressure the first operating means responds to open the first valve means to cause brake application.

8. A control valve arrangement as claimed in claim 6 wherein the third operating means includes a diaphragm which is subject to the third reference pressure comprising ambient atmospheric pressure on one side and to pilot pressure on the other side, the arrangement being such that when pilot pressure is greater than a predetermined level in excess of atmospheric pressure the third operating means responds to open the third valve means to connect auxiliary reservoir pressure to the pilot pressure output passage to maintain the pilot pressure against leakage.

9. A control valve arrangement according to claim 5 wherein the railway braking system is of the direct release kind in which the brake pipe is connected to provide the control pressure, the auxiliary reservoir is connected to provide the first reference pressure, the brake pipe is also connected so as to comprise the first source of pressure, and in which the pilot pressure produced by the valve is connected to pneumatically pilot the switching of other functions.

10. A control valve arrangement as claimed in claim 9 wherein the brake pipe pressure is connected to the first valve means through a one-way valve means arranged to prevent flow-back to the brake pipe pressure.

* * * * *